US007867652B2

(12) United States Patent
Welker et al.

(10) Patent No.: US 7,867,652 B2
(45) Date of Patent: Jan. 11, 2011

(54) SURFACE TREATMENT FOR METAL-POLYMER LAMINATED ELECTROCHEMICAL CELL PACKAGE

(75) Inventors: Edward Earl Welker, Indianapolis, IN (US); Franklin E Yarber, Lebanon, IN (US)

(73) Assignee: EnerDel, Inc., Indianapolis, IN (US)

( * ) Notice: Subject to any disclaimer, the term of this patent is extended or adjusted under 35 U.S.C. 154(b) by 1172 days.

(21) Appl. No.: 11/459,977

(22) Filed: Jul. 26, 2006

(65) Prior Publication Data
US 2006/0257572 A1 Nov. 16, 2006

Related U.S. Application Data

(62) Division of application No. 10/827,539, filed on Apr. 19, 2004, now abandoned.

(51) Int. Cl.
 H01M 2/02 (2006.01)
 H01M 10/40 (2006.01)
 B32B 15/08 (2006.01)

(52) U.S. Cl. ............... 429/177; 429/176; 428/461
(58) Field of Classification Search ............... None
See application file for complete search history.

(56) References Cited

U.S. PATENT DOCUMENTS

2002/0142178 A1* 10/2002 Yamashita et al. .......... 428/461

* cited by examiner

*Primary Examiner*—John S Maples
(74) *Attorney, Agent, or Firm*—Ice Miller LLP

(57) ABSTRACT

A method for preparing a metal-polymer laminate packaging material, a method for preparing a metal-polymer laminated electrochemical cell package, and an electrochemical cell package, wherein adhesion of the polymer to the metal sheet used in the packaging material and/or hydrophobicity of the metal sheet are improved. In accordance with the invention, the metal sheet is subjected to a surface treatment and thereafter coated with a polymer to form a metal-polymer laminate packaging material. Exemplary surface treatments include chromate or phosphate conversion coatings, anodization, or chemically cleaning the metal sheet with a caustic solution and/or an acidic solution.

15 Claims, 2 Drawing Sheets

SURFACE TREATMENT FOR METAL-POLYMER LAMINATED ELECTROCHEMICAL CELL PACKAGE

RELATED APPLICATIONS

This is a divisional patent application that claims priority to a patent application Ser. No. 10/827,539, filed on Apr. 19, 2004, now abandoned.

TECHNICAL FIELD

This invention relates to electrochemical cell packaging, such as packaging for lithium ion battery cells, and in particular, a surface treatment for metal sheet material used for metal-polymer laminated packaging material.

BACKGROUND OF THE INVENTION

The ever-increasing demand for battery-powered electronic equipment has driven the need for improved rechargeable electrochemical cells having high specific energies. The most attractive of these types of cells are the lithium-ion cells, Lithium-ion cells and batteries are secondary (i.e., rechargeable) energy storage devices well known in the art. The lithium-ion cell, known also as a rocking chair type lithium battery, typically comprises a carbonaceous negative electrode that is capable of intercalating lithium-ions, a lithium-retentive positive electrode that is also capable of intercalating lithium-ions, and a separator impregnated with non-aqueous, lithium-ion-conducting electrolyte therebetween. The electrolyte in such lithium-ion cells comprises a lithium salt dissolved in a non-aqueous solvent which may be (1) completely liquid, (2) an immobilized liquid, (e.g., gelled or entrapped in a polymer matrix), or (3) a pure polymer. The electrolyte is incorporated into the pores of the positive and negative electrode and in a separator layer between the positive and negative electrode.

Lithium-ion cells are often made by laminating thin films of the negative electrode, positive electrode and separator together wherein the separator layer is sandwiched between the negative electrode and positive electrode layers to form an individual cell. Conventional cells have typically been enclosed in a rigid case, typically made of stainless steel, to apply pressure to the cell components to maintain good electrical connections between the components. However, the trend is to reduce the size and weight of battery cells by replacing the rigid case with a polymer-metal laminate packaging material. The laminate packaging typically comprises a metal sheet, such as an aluminum foil, between two polymer films. One problem experienced with these laminate packaging materials is delamination of the polymer from the aluminum foil when exposed to the battery electrolyte, and subsequent corrosion of the aluminum by the corrosive electrolyte. Another problem encountered with the laminate packaging materials is a poor seal at the interface between the packaging material and the conductive leads. U.S. Patent Application Publication No. 2003/0031926 A1 provides a surface treatment for the conductive leads to provide a more reliable hermetic seal between the conductive leads and the packaging material. However, there exists a need for an improved packaging material that addresses the problem of delamination of the polymer from the metal sheet and the resulting corrosion.

SUMMARY OF THE INVENTION

The present invention provides a method for preparing a metal-polymer laminate packaging material, a method for preparing a metal-polymer laminated electrochemical cell package, and an electrochemical cell package, wherein adhesion of the polymer to the metal sheet used in the packaging and/or hydrophobicity of the metal sheet are improved, thereby addressing the problem of delamination of the polymer from the metal sheet and the resulting corrosion. To that end, a metal sheet is subjected to a surface treatment and thereafter coated with a polymer to form a metal-polymer laminate packaging material. Exemplary surface treatments in accordance with the present invention include chromate or phosphate conversion coatings, anodization, or chemically cleaning the metal sheet with a caustic solution and/or an acidic solution. To form the electrochemical cell package, an electrochemical cell is placed in a package formed of the metal-polymer laminate, and the electrochemical cell is sealed therein. In one embodiment of the present invention, the packaging of the electrochemical cell includes a protective coating that not only increases adhesion between the metal and polymer of the laminate packaging material but also seals out water vapor and prevents corrosion of the metal.

BRIEF DESCRIPTION OF THE DRAWINGS

The present invention will now be described, by way of example, with reference to the accompanying drawings, in which.

DETAILED DESCRIPTION

Figure 1:
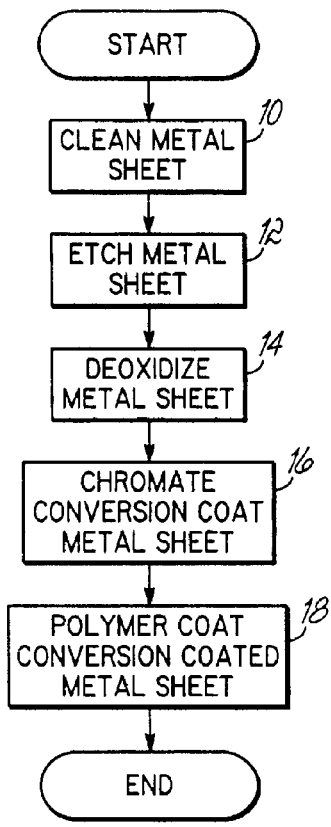
FIG. 1 depicts a process flow for application of a chromate conversion coating to a metal sheet in accordance with one embodiment of the present invention.

The present invention provides an electrochemical cell package and a method for producing a metal-polymer laminated packaging material that enhances the adhesion of the polymer layers to the metal to prevent delamination and to provide corrosion protection. The adhesion of the metal-polymer laminate packaging is improved by subjecting the metal sheet to a surface treatment. Exemplary surface treatments in accordance with the present invention include chromate or phosphate conversion coatings, anodization, or chemically cleaning the metal sheet with a caustic solution and/or an acidic solution. The surface treatment provides corrosion protection from cell electrolyte and seals out water vapor, as well as improving the adhesion of the laminated polymer layers to the metal sheet. The metal-laminate packaging of the present invention may then be used to surroundingly enclose an electrochemical cell structure and hermetically seal the structure therein. In an exemplary embodiment of the present invention, the electrochemical cell structure is a lithium-ion cell, which is known in the art.

In its broadest form, the method of the present invention includes subjecting a metal sheet to a surface treatment to increase the polymer adhesion of the surfaces of the metal sheet and/or to increase the hydrophobicity of the surfaces of the metal sheet, and thereafter, coating the surface treated metal sheet with a polymer to form a metal-polymer laminate. An electrochemical cell may then be packaged in the metal-polymer laminate. In an exemplary embodiment of the present invention, the metal sheet is an aluminum foil. Advantageously, the metal sheet has a thickness of at least 17 μm. In another exemplary embodiment, the metal sheet is surface treated by forming a chromate or phosphate conversion coating thereon. In yet another embodiment of the present invention, the metal sheet is anodized to form a porous oxide coating. The metal sheet may also be surface treated by cleaning the surface to remove oils and/or other residues that interfere with adhesion of the polymer to the metal sheet.

In accordance with one embodiment of the present invention, the metal sheet used in forming the metal-polymer laminate packaging is treated to apply a chromate conversion coating to the metal sheet. "Conversion" coatings are formed in place at a substrate metal surface, incorporating metal ions dissolved from the surface. Thus, these coatings are integrally bonded to the substrate metal, as opposed to being an additive layer over the substrate metal. Chromate conversion coatings are well known in the art of metal finishing. A chromate conversion coating may be obtained either chemically or electrochemically using a mixture of hexavalent chromium and certain other compounds (e.g., sodium hexafluorosilicate, and barium nitrate) resulting in a surface finish that is a complex mixture of chromium compounds. These coatings become hydrophobic, less soluble, abrasion resistant, and corrosion resistant over time.

A suitable coating thickness is generally on the order of a few angstroms, for example, 2-5 Å (0.2-0.5 nm), but may vary between 2 Å (0.2 nm) and 30 Å (3 nm). By way of example only, an aluminum sheet may be immersed in a bath of a solution of hexavalent chromium compounds, for example chromium trioxide, at a pH of 1.3-2.0 and at a temperature of 60-120° F. (15.5-49° C.) for 15 seconds to 6 minutes, depending on the thickness of the coating desired. It may be understood, however, that the pH of the solution, the concentration of hexavalent chromium in the solution, the time of immersion, and pre-treatments to the metal itself may be varied, as desired.

FIG. 1 depicts an exemplary process flow for application of a chromate conversion coating to a metal sheet material in accordance with one embodiment of the present invention. The chromate conversion coating process may be applied to an aluminum foil, or any other sheet material desired for use in the laminate packaging. It may also be appreciated that the process flow described herein below includes pre-treatments that are advantageous, but that may not be necessary for application of a functional chromate conversion coating such that variations in the parameters and pre-treatment steps may produce acceptable coatings. Prior to coating, the metal sheet is cut to a desirable size for forming the packaging. By way of example, the sheet material may have a thickness of at least 17 μm, and the length and width dimensions may vary depending on the size and format of the electrochemical cell for which it is to be used.

Referring to FIG. 1, the metal sheet is cleaned in step 10 in a mildly alkaline solution to remove oil, grease, and other foreign material from the surface. For example, the metal sheet may be immersed in a solution of sodium dodecylbenzene sulfonate or other suitable metal cleaning agent at a temperature of ambient to 160° F. (71° C.) for about 30 seconds to about 10 minutes. After rinsing in deionized water, the cleaned metal sheet is etched in step 12 in a strongly alkaline solution to remove light soils and provide a decorative uniform etch on the sheet surface. A suitable etching may be achieved in a bath of concentrated NaOH at ambient to 160° F. (71° C.) for 30 seconds to 10 minutes. After rinsing in water, the etched metal sheet is deoxidized in step 14 to remove smut left by cleaning and/or etching of the metal sheet. The deoxidizing may be accomplished, for example, by immersion in a solution containing sulfuric acid, iron salts soluble in nitric acid, and fluoroboric acid at a pH of 1-1.5 and an ambient temperature for 30-120 seconds. Following a further rinse with water, the chromate conversion coating is applied in step 16. As noted above, depending on the condition of the metal sheet surface, some or all of the pre-treating procedures described above may not be necessary. Pre-treating, however, ensures that the metal sheet surface is properly prepared to receive the chromate coating. In addition to the above pre-treatments, a bright finishing treatment may also be performed after deoxidation to further remove light oils, moderate to heavy oxides, mill markings and otherwise prepare the surface for the conversion coating in step 16. A bright finishing treatment, for example, may involve immersing the metal sheet in a strong acid bath, such as phosphoric acid, for 1-10 minutes at ambient temperature.

The chromate conversion coating in step 16 may be achieved by contacting the metal sheet with a solution of hexavalent chromium compounds, such as chromium trioxide, an inorganic fluoride such as sodium hexafluorosilicate, and barium nitrate at a pH of 1.3-2.0 and a temperature of 60-120° F. (15.5-49° C.). Contact with the solution may be made by brushing, spraying, or immersion, for example. The time of contact with the chromium solution may be from 15 seconds to 6 minutes, for example, depending on the thickness of the coating desired. Following coating, the metal sheet is rinsed in water and dried. In step 18, the conversion coated metal sheet is further coated with a polymer to form a metal-polymer laminate. Advantageously, a polymer layer is laminated to each side of the coated metal sheet to sandwich the metal sheet between the polymer layers. The lamination may be achieved, for example, by extruding a polymer film onto each side of the coated metal sheet.

Figure 2:
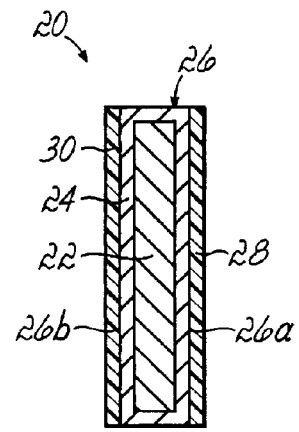
FIG. 2 depicts a cross-sectional view of a metal-polymer laminated packaging material in accordance with one embodiment of the present invention.

FIG. 2 depicts a cross-sectional view of a metal-polymer laminated packaging material 20 formed by the process flow set forth in FIG. 1. Packaging material 20 includes the metal sheet 22 and a chromate conversion coating 24 thereon to form a conversion coated metal sheet 26. An inner polymer layer 28 is laminated to a first side 26a of the conversion coated metal sheet 26, such as by extrusion, and an outer polymer layer 30 is laminated to a second side 26b of the conversion coated metal sheet 26, such as by extrusion. The inner and outer polymer layers 28, 30 may each be composed of one or more layers of polymers, as is known in the art, and may be of any desired thickness. The metal sheet may be any metal desired and aluminum is currently standard in the lithium battery art.

In accordance with another embodiment of the present invention, the metal sheet used in forming the metal-polymer laminate packaging is treated to apply a phosphate conversion coating to the metal sheet. Metal phosphate coatings are insoluble in water, but soluble in mineral acids. Thus, phosphating solutions include metal phosphates dissolved in balanced solutions of phosphoric acid. As long as the acid concentration of the bath remains above a critical point, the metal phosphate remains in the solution. When a reactive metal sheet material is contacted with (e.g., immersed in) a phosphating solution, light pickling takes place and the acid concentration is reduced at the liquid-metal interface. Metal from the substrate is dissolved, hydrogen is evolved, and a phosphate coating is precipitated on the metal sheet material surface. Phosphate conversion coatings put the metal sheet surface in a water-resistant (hydrophobic), non-alkaline condition, and impose relative uniformity in surface texture. Phosphate conversion coatings also increase the surface area upon which the systems of attractive forces causing adhesion can act by creating capillaries and micro-cavities and insulate the coated metal sheet against electrochemical corrosion.

Phosphate conversion coatings may be applied to the metal sheet material in accordance with the present invention in any suitable manner, including by brush, spray, or immersion. In addition, several types of phosphate coatings may be used in accordance with the present invention. Exemplary phosphate conversion coating application techniques for iron, zinc and manganese phosphate conversion coatings are discussed below. Other phosphate coatings, as are known by or apparent to one skilled in the art, from the present disclosure may also be used.

Figure 3:
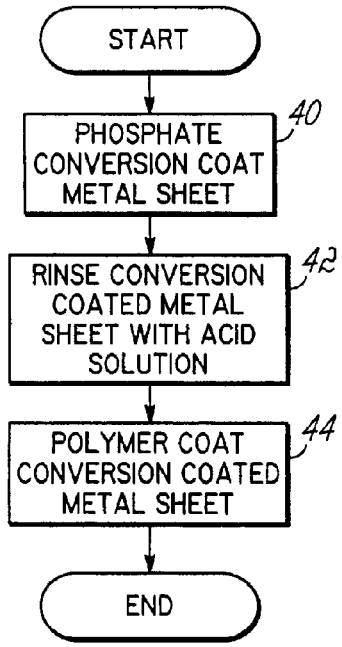
FIG. 3 depicts a process flow for application of a phosphate conversion coating to a metal sheet in accordance with one embodiment of the present invention.

FIG. 3 provides an exemplary general process flow for applying metal phosphate conversion coatings in accordance with the method of the present invention. In step 40, the metal sheet is phosphate conversion coated by contacting the metal sheet with a phosphating solution. The phosphated metal sheet material is then rinsed with water and treated with an acid solution rinse in step 42 for pollution reduction. After drying the coated metal sheet, a polymer coating is applied in step 44 to form the metal-polymer laminate. Again, a polymer layer is advantageously laminated to each side of the coated metal sheet, such as by extrusion, to sandwich the metal sheet between the polymer layers. The resulting structure is essentially the same as that depicted in FIG. 2, except that the coating 24 will be a metal phosphate conversion coating rather than a chromate conversion coating.

To form an iron phosphate conversion coating in accordance with an exemplary embodiment of the method of the present invention, step 40 simultaneously cleans the metal sheet. An iron phosphating spray may be used, for example, in which an iron phosphate solution is composed of 0.5-2 oz. of iron phosphate per gallon of water with a pH of 3.5-5.0. The solution may be sprayed at a temperature of 60-160° F. (15.5-71° C.) for 60-120 seconds. Alternatively, an iron phosphating solution dip may be used wherein the solution is composed of about 5% iron phosphate in water with a pH of 3.5-4.5. The metal sheet may be immersed in the dip having a temperature of 125-160° F. (52-71° C.) for 3-5 minutes. Step 40 may be followed by a recirculating water bath rinse at 90° F. (32° C.) for about 20 seconds, followed by an acid solution rinse in step 42.

To form a zinc phosphate conversion coating in accordance with an exemplary embodiment of the method of the present invention, the metal sheet may be subjected to one or more preliminary steps prior to the phosphate conversion coating in step 40. For example, the metal sheet may be pre-cleaned and rinsed with water, then treated with a sensitizing rinse. This pre-cleaning step may be conducted by spraying the sheet material with an alkaline solution of 0.5-1.0 oz. strong base, for example NaOH or KOH, per gallon of water at 100-160° F. (38-71° C.) for 30 seconds. The sheet material may then be rinsed in a re-circulating water bath at 90° F. (32° C.) for 30 seconds, followed by a sensitizing rinse of, for example, a titanium activator solution composed of 1 lb activator per 1000 gallons of water at 90° F. (32° C.) for 30 seconds. The zinc phosphate treatment of step 40 may be applied by spraying a phosphate solution composed of 2.5% by volume zinc phosphate in water (total to free acid ratio: 13:1 to 20:1) for 60 seconds at a temperature of 100-140° F. (38-60° C.). Alternatively, the phosphating treatment may include a 3-5 minutes spray at a temperature of 140-180° F. (60-82° C.) using a zinc phosphate solution composed of 4% by volume zinc phosphate in water (total to free acid ratio: 6:1 to 12:1). Step 40 may be followed by a re-circulating water bath rinse at 90° F. (32° C.) for about 20 seconds, followed by an acid solution rinse in step 42.

A manganese phosphate conversion coating in accordance with an exemplary embodiment of the method of the present invention may also include the pre-cleaning and sensitizing rinse steps prior to formation of the manganese phosphate conversion coating in step 40. The metal sheet may be pre-cleaned with a hot alkaline cleaner and rinsed with hot water, followed by treating the metal sheet with a hot sensitizing rinse. Step 40 advantageously includes immersion in a manganese phosphate solution at a temperature of 200-210° F. (93-99° C.) for 10-30 minutes. The phosphate coated metal sheet may then be rinsed with cold water prior to an acid solution rinse in step 42.

As with the chromate conversion coatings, a suitable coating thickness for phosphate conversion coatings is on the order of a few angstroms, but may vary between a few angstroms and a few tens of angstroms. More specifically, the phosphate conversion coatings may vary in thickness between 2 Å (0.2 nm) and 30 Å (3 nm). After step 40, the acid solution rinse of step 42 may, for example, be applied for 20-30 seconds using a solution of 4-12 oz. of $H_3PO_4$ per 100 gallons of water with a pH of 3.5-5.0 at a temperature of 90-160° F. (32-71° C.).

Figure 4:
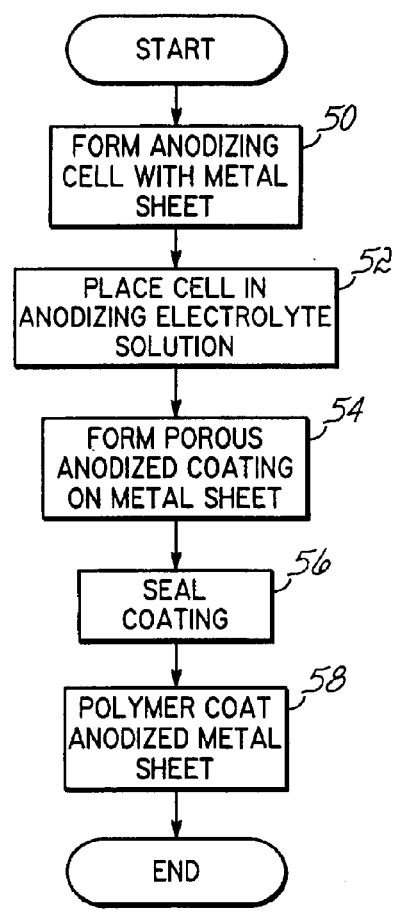
FIG. 4 depicts a process flow for anodizing a metal sheet in accordance with one embodiment of the present invention.

FIG. 4 provides an exemplary process flow for another embodiment of the present invention in which the surface treatment involves anodizing the metal sheet. As is well known in the metal finishing arts, when a metal part, such as aluminum, is made the anode in an electrolytic cell, an oxide film is formed on the metal. The oxide film grows from the base metal and imparts to the metal a hard, corrosion and abrasion resistant coating with excellent wear properties. Thus, anodizing coverts the metal surface to metal oxide. The nature of the film formed is controlled by the electrolyte and anodizing conditions used. If the coating is slightly soluble in the electrolyte, porous oxide films are formed. As the coating grows under the influence of the applied current, it also dissolves and pores develop. Without intending to be limited by theory, it is this porous property that is believed to result in a stronger bond between the metal sheet and the polymer layers of the laminate packaging material. The resulting laminate packaging structure is essentially the same as that depicted in FIG. 2, except that the coating 24 will be a porous oxide film rather than a chromate conversion coating.

Referring to FIG. 4, an anodizing cell is formed in step 50 using the metal sheet as the anode paired with a cathode. The cathode material may be the same as the metal sheet material, for example, aluminum. An anode/cathode ratio of approximately 3:1 is advantageous. The anodizing cell electrodes are placed in an anodizing electrolyte solution in step 52. A typical anodizing electrolyte solution is sulfuric acid at a concentration of 15 wt./vol. % (e.g., 165 gm/L). Alternatively, almost any acid solution can be used, including chromic, oxalic, and phosphoric acids. The temperature of a sulfuric acid solution may be 60-80° F. (15.5-27° C.) with a current density of 10-15 A/ft$^2$. The anodized coating is slightly soluble in this sulfuric acid solution, thereby providing the conditions for formation of a porous oxide film in step 54. The duration of the treatment is advantageously 12-30 minutes, depending on the film thickness desired. Once the porous anodized coating is formed, the coating is sealed in step 56 to achieve the protective and corrosion resistant properties for the metal sheet. The sealing process involves immersing the anodized sheet in a solution of boiling water or other solution, such as nickel acetate, wherein the aluminum oxide is hydrated. The coated metal sheet may then be further coated with the polymer in step 58 to form the metal-polymer laminate.

The chromate conversion coating, phosphate conversion coating, and anodizing surface treatments described above particularly enhance adhesion of the metal sheet to the polymer in the metal-polymer laminate to prevent delamination and corrosion of the packaging material. Each treatment involves conversion of the surface into a protective coating, namely a chromate, phosphate, or porous oxide protective coating. In addition to these surface treatments, adhesion of the metal sheet to the polymer may also be improved by simply cleaning the surface of the metal sheet prior to coating the metal sheet with the polymer to form the laminate. While the bond obtained by the coating methods is superior to the bond achieved simply by surface cleaning, nevertheless, the bond achieved with surface cleaning is greater than the bond formed with an untreated metal sheet. The metal sheets used for the packaging material are typically formed using slitting and drawing operations that use machine oil. The presence of this oil can contribute to delamination. Thus, a cleaning process that removes this oil will improve the adhesion and assist in preventing delamination. Oil removal may be achieved in a number of ways, including an acid rinse, a caustic rinse, or a combination of both. Suitable cleaning acids include sulfuric acid, phosphoric acid, or gluconic acid. Suitable caustic rinses include highly alkaline salts, such as sodium hydroxide, silicates, and carbonates. In an exemplary embodiment, sodium hydroxide is the cleaning agent. Advantageously, the cleaning treatment is performed by contacting the metal sheet with the cleaning agent at an elevated temperature, for example 120-200° F. (49-93° C.) at concentrations of 0.5-2 lbs of cleaning agent per gallon of water. The cleaning agent may be applied to the sheet material by spraying, soaking, and/or electrocleaning. The cleaned sheet material is rinsed and dried prior to coating the cleaned metal sheet with the polymer to form the metal-polymer laminate.

Figure 5A:
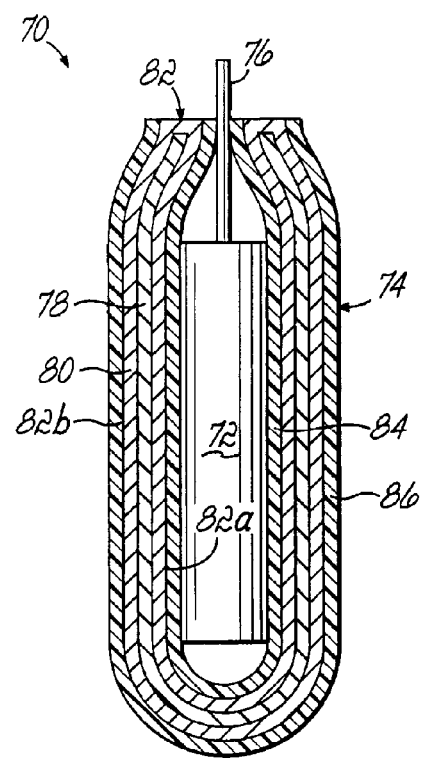
FIGS. 5A and 5B each depict in cross-sectional view an electrochemical cell package in accordance with one embodiment of the present invention.

FIG. 5 depicts an exemplary electrochemical cell package in accordance with one embodiment of the present invention. Electrochemical cell package 70 includes an electrochemical cell structure 72 and a metal-laminate packaging 74 surroundingly enclosing the electrochemical cell structure 72 with a metal lead 76 extending therefrom. The metal-laminate packaging 74 includes a metal sheet 78, advantageously aluminum, surface treated in accordance with the present invention. As shown in FIG. 5, a chromate or metal phosphate conversion coating 80 covers the metal sheet 78 to form a coated metal sheet 82. An inner polymer layer 84 is laminated to an inner surface 82a of the coated metal sheet 82 to form the inside portion of package 70 adjacent the cell structure 72. An outer polymer layer 86 is laminated to an outer surface 82b of the coated metal sheet 82 to form the outside portion of the package 70. As described in relation to FIG. 2, any known and desirable polymer or combination of polymers may be used for the inner and outer polymer layers 84, 86. The electrochemical cell package 70 of FIG. 5A may be formed by holding packaging material 20 of FIG. 2 upon itself to form the package 74 and so as to surround the electrochemical cell structure 72. To seal the package 70, the inner polymer layer 84 may be sealed to itself around the edges of the cell structure 72 so as to form a hermetic seal.

Figure 5B:
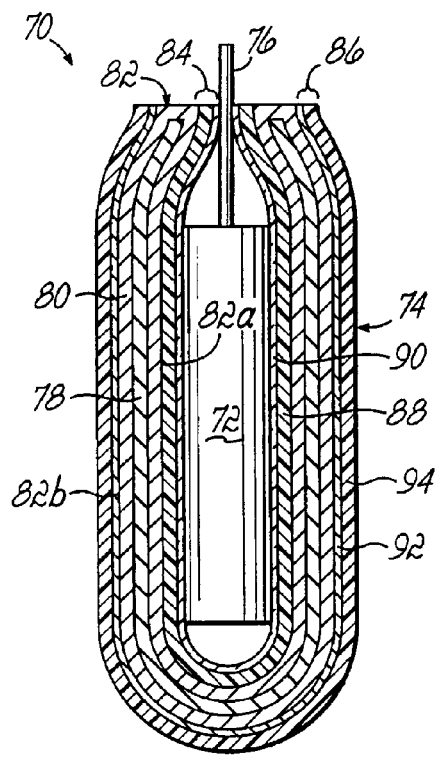

In an alternative embodiment of the present invention, as depicted in FIG. 5B, the inner polymer layer 84 of FIG. 5A may comprise a polymeric barrier coating 88 laminated to the inner surface 82a of the coated metal sheet 82 and a heat sealable layer 90 applied to the polymeric barrier coating 88. When the packaging material 74 is folded upon itself, the seal at the edge portions of the electrochemical cell will be formed by sealing the heat sealable layer 90 to itself. Also shown in FIG. 5B, the outer polymer layer 86 may include an adhesive layer 92 applied to the outer surface 82b of the coated metal sheet 82 and an outer polymer barrier coating 94 laminated to the adhesive layer 92. The inner barrier coating 88 and the outer barrier coating 94 may be extruded onto the coated metal sheet 82 or applied by any other known process for forming a metal-polymer laminate. The inner barrier coating 88 may be the same or different from the outer barrier coating 94. Also, as described above in relation to FIG. 2 and FIG. 5, any known and desirable polymer or combination of polymers may be used for the inner and outer barrier coatings 88, 94.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative structure and method and illustrative examples shown and described. Accordingly, departures may be made from such details without departing from the scope or spirit of the general inventive concept.

What is claimed is:

1. An electrochemical cell package comprising:
a metal-laminate packaging material comprising a metal sheet having a protective coating encapsulating the metal sheet to form a coated metal sheet sandwiched between an inner polymer layer comprising a polymeric binder coating laminated directly to the coating of the coated metal sheet and an outer polymer layer, wherein the protective coating is selected from the group consisting of a chromate conversion coating, a phosphate conversion coating, and an anodized porous oxide coating; and
an electrochemical cell structure surroundingly enclosed in the metal-laminate packaging material adjacent the inner polymer layer.

2. The package of claim 1 wherein the metal sheet comprises aluminum foil.

3. The package of claim 2 wherein the aluminum foil has a thickness of at least 17 µm.

4. The package of claim 1 wherein the inner polymer layer comprises a heat sealable layer on the polymeric binder coating.

5. The package of claim 4 wherein the outer polymer layer comprises an adhesive layer on the coated metal sheet and a polymeric binder coating laminated to the adhesive layer.

6. An electrochemical cell package comprising:
a lithium-ion cell structure;
a metal-laminate packaging material comprising:
a metal sheet encapsulated in a protective coating to define a coated metal sheet, the protective coating being selected from the group consisting of a chromate conversion coating, a phosphate conversion coating, and an anodized porous oxide coating;
an inner polymer layer comprising a polymeric binder coating laminated directly to the coated metal sheet; and
an outer polymer layer;
wherein the coated metal sheet is sandwiched between the inner polymer layer and the outer polymer layer; and wherein the inner polymer layer is positioned adjacent the lithium-ion cell structure and the metal-laminate packaging material surroundingly encloses the lithium ion cell structure, 7. The electrochemical cell package of claim 6 wherein the coating is a chromate conversion coating.

8. The electrochemical cell package of claim 6 wherein the coating is a phosphate conversion coating.

9. The electrochemical cell package of claim 6 wherein the phosphate conversion coating is selected from the group consisting of iron phosphate, zinc phosphate and manganese phosphate.

10. The electrochemical cell package of claim 6 wherein the coating is an anodized porous oxide coating.

11. The electrochemical cell package of claim 6 wherein the coating is an anodized porous oxide coating is a sealed coating.

12. An electrochemical cell package comprising:
a metal-laminate packaging material comprising a metal sheet having a protective coating encapsulating the metal sheet to form a coated metal sheet sandwiched between an inner polymer layer comprising a polymeric binder coating laminated directly to the coating of the coated metal sheet and an outer polymer layer comprising an adhesive layer on the coated metal sheet and a polymeric binder coating laminated to the adhesive layer, wherein the protective coating is selected from the group consisting of a chromate conversion coating, a phosphate conversion coating, and an anodized porous oxide coating; and an electrochemical cell structure surroundingly enclosed in the metal-laminate packaging material adjacent the inner polymer layer.

13. . The package of claim 12 wherein the metal sheet comprises aluminum foil.

14. The package of claim 13 wherein the aluminum foil has a thickness of at least 17 μm.

15. The package of claim 12 wherein the inner polymer layer comprises a heat sealable layer on the polymeric binder coating.

* * * * *